US012614032B2

(12) United States Patent
Todoroki

(10) Patent No.: US 12,614,032 B2
(45) Date of Patent: Apr. 28, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yusuke Todoroki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 750 days.

(21) Appl. No.: 17/973,603

(22) Filed: Oct. 26, 2022

(65) Prior Publication Data

US 2023/0137350 A1 May 4, 2023

(30) Foreign Application Priority Data

Nov. 1, 2021 (JP) .................................. 2021-178618

(51) Int. Cl.
*G06F 40/284* (2020.01)
*G06V 30/10* (2022.01)

(52) U.S. Cl.
CPC ............ *G06F 40/284* (2020.01); *G06V 30/10* (2022.01)

(58) Field of Classification Search
CPC ..... G06F 40/284; G06F 40/114; G06V 30/10; G06V 30/416; G06V 30/418; G06V 10/82
See application file for complete search history.

(56) References Cited

U.S. PATENT DOCUMENTS 5,813,009 A * 9/1998 Johnson .................. G06F 16/40
707/916
11,443,416 B2 * 9/2022 Liao .................... G06F 16/5854
(Continued)

FOREIGN PATENT DOCUMENTS

CN 106919545 A * 7/2017 ........... G06F 40/205
JP 2002024258 A * 1/2002
(Continued)

OTHER PUBLICATIONS

Wiedemann, Gregor, and Gerhard Heyer. "Multi-Modal Page Stream Segmentation with Convolutional Neural Networks—Language Resources and Evaluation." SpringerLink, Springer Netherlands, Sep. 27, 2019 (Year: 2019).*

(Continued)

*Primary Examiner* — Vu Le

(74) *Attorney, Agent, or Firm* — Venable LLP

(57) ABSTRACT

An image processing apparatus divides scanned image data including page images obtained by scanning a plurality of documents for each page into image data of each document. The apparatus generates text data by performing character recognition processing for the plurality of page images, sequentially obtains a pair of page images in succession from the plurality of page images and then determines a document delimitation position based on text data of the two page images constituting the pair, and divides the scanned image data at the determined delimitation position. A vector corresponding to tokens is obtained by decomposing the text of each of the two page images constituting the pair is generated and input to a neural network model, the delimitation position is determined by using a score output from the neural network model and represents a possibility value that the two page images constituting the pair belong to different documents.

16 Claims, 7 Drawing Sheets

(56)                  References Cited

U.S. PATENT DOCUMENTS

| | | | | |
|---|---|---|---|---|
| 2015/0161078 A1* | 6/2015 | Cholleti | ............... | G06F 21/6245 |
| | | | | 715/201 |
| 2020/0125630 A1* | 4/2020 | Sanghavi | ............... | G06F 40/114 |
| 2022/0171965 A1* | 6/2022 | Kumar | ...................... | G06N 3/09 |
| 2023/0101817 A1* | 3/2023 | Sinha | ...................... | G06F 16/41 |
| | | | | 707/722 |
| 2023/0368557 A1* | 11/2023 | Kolavennu | ............ | G06F 18/23 |
| 2024/0070436 A1* | 2/2024 | Xu | ......................... | G06N 3/045 |
| 2024/0161522 A1* | 5/2024 | Khan | ................... | G06V 30/133 |

FOREIGN PATENT DOCUMENTS

| | | | | | | |
|---|---|---|---|---|---|---|
| JP | 2002312385 | A | * | 10/2002 | | |
| JP | 4023075 | B2 | * | 12/2007 | | |
| JP | 2011018316 | A | * | 1/2011 | ........... | G06V 30/414 |
| JP | 2021057710 | A | * | 4/2021 | ......... | H04N 1/00068 |
| JP | 2021086480 | A | * | 6/2021 | ............. | G06Q 30/04 |
| WO | WO-2020201746 | A1 | * | 10/2020 | ............. | G06N 3/084 |

OTHER PUBLICATIONS

Lambert: Layout-Aware Language Modeling for Information Extraction, Garncarek et al (Year: 2021).*

Delvin, J et al., "BERT: Pre-training of Deep Bidirectional Transformers for Language Understanding", Proceedings of NAACL-HLT 2019, Jun. 2 to 7, 2019, pp. 4171 to 4186 (16 pages).

Nakayama, A. et al. "Reducing Prediction Target Data in Resource Construction Sharing Tass Using Active Sampling", Proceedings of the Twenty-seventh Annual Meeting of the Association for Natural Language Processing. pp. 1189 to 1192.

Office Action issued Sep. 2, 2025, in corresponding Japanese Patent Application No. 2021-178618, with English translation (8 pages).

* cited by examiner

IMAGE PROCESSING APPARATUS, IMAGE PROCESSING METHOD, AND STORAGE MEDIUM

BACKGROUND

Cross-Reference to Priority Application

This application claims the benefit of Japanese Patent Application No. 2021-178618, filed Nov. 1, 2021 which is hereby incorporated by reference herein in its entirety.

FIELD OF THE DISCLOSURE

The technique of the present disclosure relates to a technique to divide a scanned image obtained by scanning a plurality of documents en bloc into each document.

DESCRIPTION OF THE RELATED ART

In recent years, digitalization has been driven in a variety of businesses and, as one example, there is an increasing trend for various documents used in business to become paperless (computerization). At the time of computerizing a document, the work to scan a document, which is a printed material, by using a scanner, or the like, to generate image data thereof occurs. At the time of this work, it is inefficient to scan a large number of business forms one by one, and, therefore, all the pages across a plurality of documents are scanned en bloc and the obtained scanned image data is automatically divided into the image data of each document. Japanese Patent Laid-Open No. 2002-312385 has disclosed a method of automatically dividing documents by finding the frequency of appearance of each word from text information on two pages in succession, calculating the degree of similarity in text between both pages, and delimiting the document at the portion between pages whose degree of similarity is low.

With the method that utilizes the frequency of appearance of words described above, the order of words that appear, the dependence relationship between words, the meaning and contents of the context are not taken into consideration, and, therefore, it is known that there is a limit to the division accuracy. For example, in a case of the method of Japanese Patent Laid-Open No. 2002-312385 described above, on a condition that only the names of the person and the organization within the document are different in the separate documents created by using the same template, the degree of similarity between pages in the separate documents becomes high, and therefore, the delimitation position is erroneously specified sometimes.

SUMMARY

The image processing apparatus according to the present disclosure is an image processing apparatus that divides scanned image data including a plurality of page images obtained by scanning a plurality of documents en bloc for each page into image data of each document and includes one or more memories storing instructions and one or more processors executing the instructions to generate text data by performing character recognition processing for the plurality of page images, to sequentially obtain a pair of page images in succession from the plurality of page images and, then, to determine a document delimitation position based on text data of the two page images constituting the pair and to divide the scanned image data at the determined delimitation position, and, in the determining, a vector corresponding to tokens obtained by decomposing the text of each of the two page images constituting the pair is generated and input the vector to a neural network model, and the delimitation position is determined by using a score output from the neural network model and representing the level of a possibility by a numerical value that the two page images constituting the pair belong to different documents, respectively.

Further features of the present disclosure will become apparent from the following description of exemplary embodiments with reference to the attached drawing.

DESCRIPTION OF THE EMBODIMENTS

Hereafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<Hardware Configuration of Information Processing Apparatus>

Figure 1:
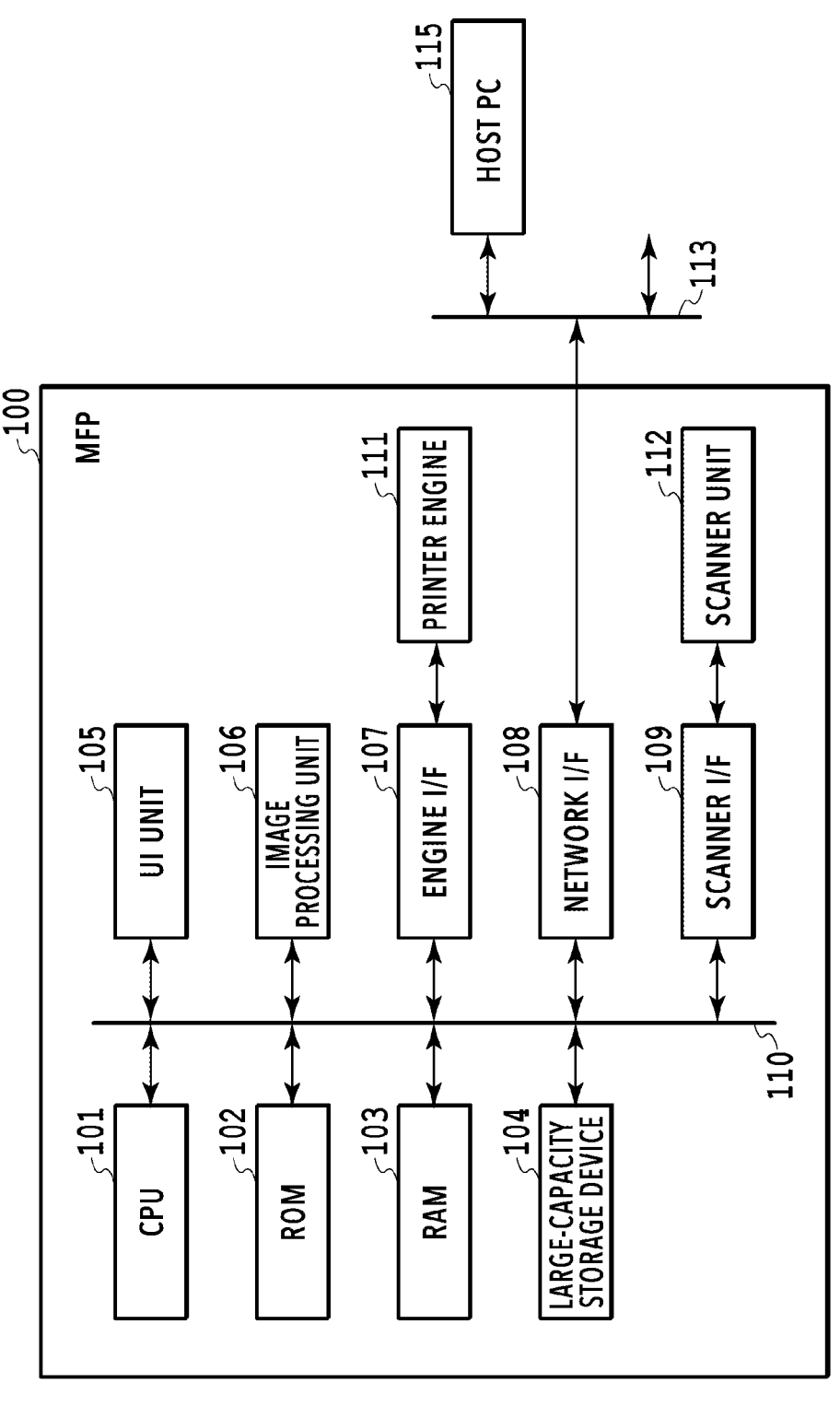
FIG. 1 is a block diagram showing a hardware configuration of a multi-function processor (i.e., an MFP)

FIG. 1 is a block diagram showing a hardware configuration of an MFP as an information processing apparatus comprising an automatic division function of a plurality of documents according to the present embodiment. An MFP 100 comprises a CPU 101, a ROM 102, a RAM 103, a large-capacity storage device 104, a UI unit 105, an image processing unit 106, an engine interface (I/F) 107, a network I/F 108, and a scanner I/F 109. Each of these units is connected to one another via a system bus 110. Further, the MFP 100 comprises a printer engine 111 and a scanner unit 112. The printer engine 111 and the scanner unit 112 are connected to the system bus 110 via the engine I/F 107 and the scanner I/F 109, respectively. The image processing unit 106 may be configured as an image processing apparatus (image processing controller) independent of the MFP 100.

The CPU 101 controls the entire operation of the MFP 100. The CPU 101 performs various kinds of processing, to be described later, by reading programs stored in the ROM 102 onto the RAM 103 and executing the programs. The ROM 102 is a read-only memory and in which system activation programs or programs for controlling a printer engine, character data or character code information, and the like, are stored. The RAM 103 is a volatile random access memory and used as a work area of the CPU 101 and as a temporary storage area of various kinds of data. For example, the RAM 103 is used as a storage area for storing font data additionally registered by download, image files received from an external device, and the like. The large-capacity storage device 104 is, for example, an HDD and an SSD, and in which a variety of pieces of data are spooled and that is used for storage of programs, various tables, information files, image data, and the like, and as a work area.

The UI (User Interface) unit 105 includes, for example, a liquid crystal display (LCD) comprising a touch panel function and displays the setting state of the MFP 100, the situation of processing being performed, the error state, and the like. The UI unit 105 is also used to display the results of performing processing to divide scanned image data of a plurality of documents into image data of each document according to the present disclosure. Further, the UI unit 105 receives various user instructions, such as input values in various settings of the MFP 100 and to select various buttons. For example, instructions to perform a scan to scan a plurality of documents en bloc, and the like, are also given via the UI unit 105. In the present embodiment, as the scan-target plurality of documents, a collection (document group) of a plurality of kinds of document whose formats are different, for example, such as a document bundle bound into a binder, is supposed. A user gives instructions to perform a scan after setting a document bundle in an ADF (Auto Document Feeder), not shown schematically. It may also be possible for the UI unit 105 to separately comprise an input device, such as a hard key.

The image processing unit 106 performs processing to divide the scanned image data obtained at the time of scanning a plurality of documents en bloc by the scanner unit 112 into image data of each document. Further, the image processing unit 106 also performs image processing other than that described above, such as processing to generate print image data for the printer engine 111 from PDL data input from the outside. Details of the image processing unit 106 will be described later by using FIG. 2. In FIG. 1, the CPU 101 and the image processing unit 106 are described separately, but, in the present embodiment, it is assumed that the CPU 101 functions as the image processing unit 106 by executing programs. However, this is not limited and it may also be possible to implement the image processing unit 106 by a dedicated circuit, such as a GPU and an ASIC.

The engine I/F 107 functions as an interface for controlling the printer engine 111 in accordance with instructions from the CPU 101 at the time of performing printing. Via the engine I/F 107, engine control commands, and the like, are transmitted and received between the CPU 101 and the printer engine 111. The network I/F 108 functions as an interface for connecting the MFP 100 to a network 113. The network I/F 108 may be, for example, a LAN or a public switched telephone network (PSTN). The printer engine 111 forms a multicolored image on a printing medium, such as paper, by using color materials (here toner) of a plurality of colors (here, four colors of CMYK) based on print image data received from the side of the system bus 110. The scanner I/F 109 functions as an interface for controlling the scanner unit 112 in accordance with instructions from the CPU 101 at the time of performing scanning of a document by the scanner unit 112. Via the scanner I/F 109, scanner unit control commands, and the like, are transmitted and received between the CPU 101 and the scanner unit 112. The scanner unit 112 generates scanned image data by scanning (optically reading) a document bundle set in the ADF for each page under the control of the CPU 101. The generated scanned image data is transmitted to the large-capacity storage device 104 via the scanner I/F 109.

<Details of Image Processing Unit>

Figure 2:
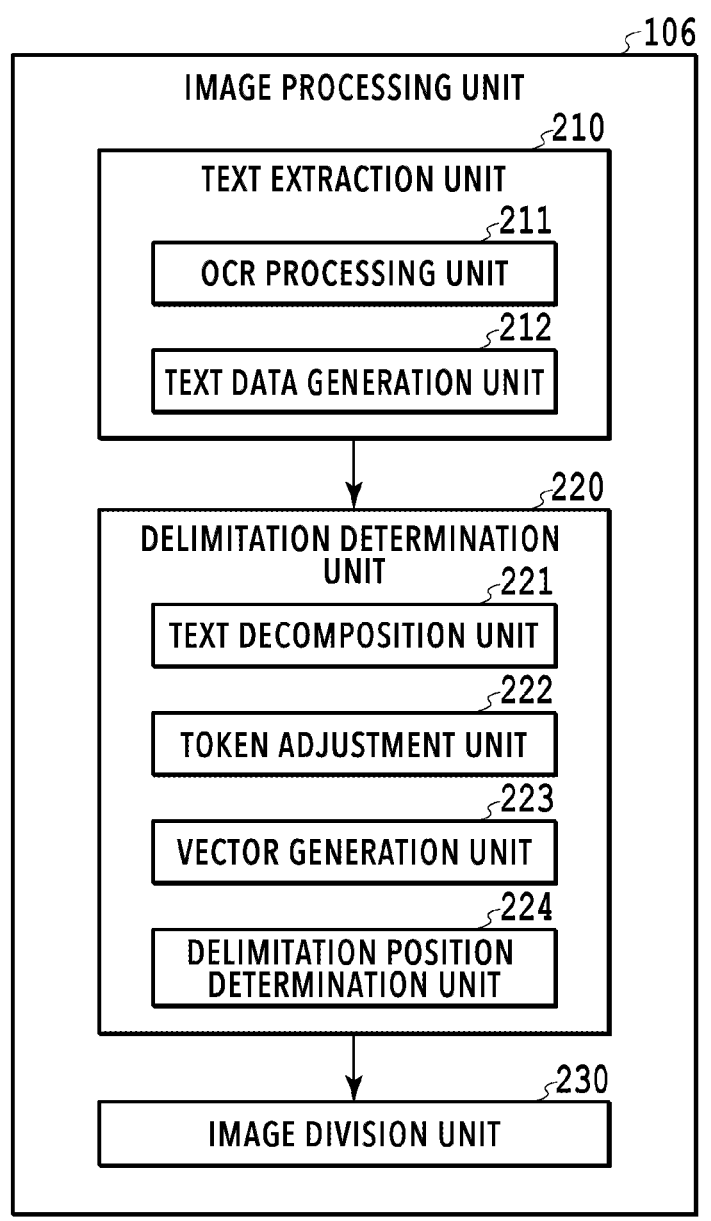
FIG. 2 is a function block diagram showing details of an image processing unit.

FIG. 2 is a function block diagram showing details of the image processing unit 106 and particularly showing only the functions related to processing to divide the scanned image data of a document bundle into image data of each document (in the following, called "image division processing"). As shown in FIG. 2, the image processing unit 106 has a text extraction unit 210, a delimitation determination unit 220, and an image division unit 230.

The text extraction unit 210 converts page image data related to an obtained page pair into text data for which it is possible to perform language processing. The text extraction unit 210 includes an OCR processing unit 211 configured to perform OCR (Optical Character Recognition) processing for a character area within the page image, and a text data generation unit 212 configured to generate text data representing a character string or sentence within a page based on results of OCR processing.

The delimitation determination unit 220 determines a document delimitation position (boundary between documents) in the scanned image data of a plurality of documents based on the text data of each page, which is generated by the text extraction unit 210. The delimitation determination unit 220 includes four processing units, that is, a text decomposition unit 221, a token adjustment unit 222, a vector generation unit 223, and a delimitation position determination unit 224. The text decomposition unit 221 is generally called a tokenizer and performs processing to decompose text into tokens. Here, the token is the minimum unit of language information that is input to a neural network model. The token adjustment unit 222 performs processing to adjust the decomposed token to a token suitable to the neural network model. The vector generation unit 223 performs processing to convert the adjusted token into a vector in the format that can be input to the neural network model. The delimitation position determination unit 224 inputs the vector generated by the vector generation unit 223 to the neural network model and then determines a document delimitation position in the scanned image data of the plurality of documents.

The image division unit 230 divides the input scanned image data of the plurality of documents into image data of each document based on the determination results by the delimitation determination unit 220.

Each function unit shown in FIG. 2 is implemented by the CPU 101 executing programs stored within the ROM 103 and programs, such as applications, loaded onto the RAM 102 from the large-capacity storage device 104.

<Image Division Processing>

Figure 3:
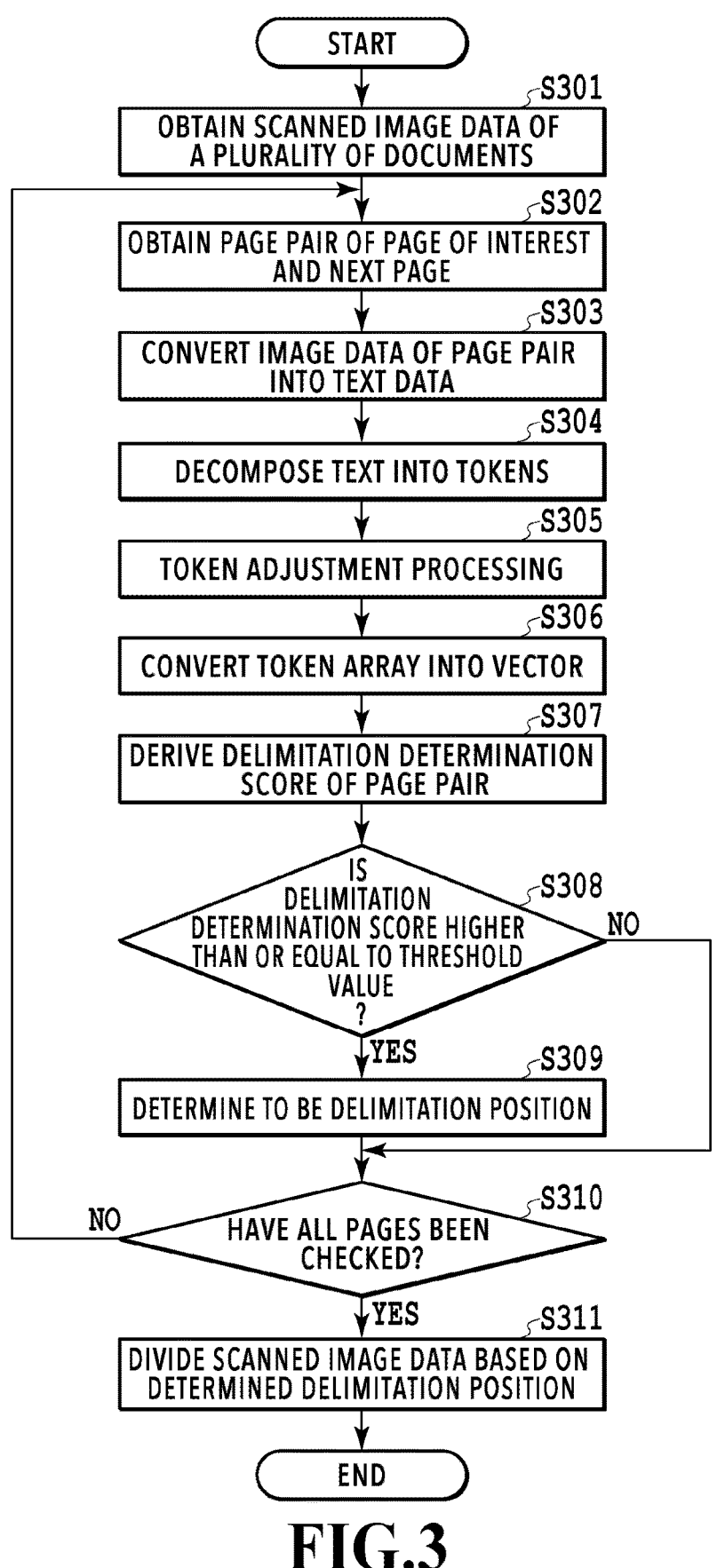
FIG. 3 is a flowchart showing a flow of image division processing.

FIG. 3 is a flowchart showing a flow of image division processing by the image processing unit 106 according to the present embodiment. In the following, along the flowchart in FIG. 3, the image division processing is explained in detail. In the following explanation, symbol "S" means a step.

At S301, the scanned image data obtained by scanning the document bundle en bloc for each page by the scanner unit 112 is read from the large-capacity storage device 104 and obtained as processing-target image data. It may also be possible to directly obtain the scanned image data obtained by the scanner unit 112 via the system bus 111.

At S302, from the input scanned image data, a combination of the page image of interest and the next page image, that is, a pair of two page images in succession (in the following, called "page pair") is obtained. By taking all the page images within the input scanned image data as a target, the page pair is obtained sequentially by selecting the page of interest in order from the top page, such as the pair of the first page and the second page, the pair of the second page and the third page, and so on. Here, the scanned image data is obtained by scanning the document bundle, and, therefore, two patterns of the page pair exist, that is, the page pair whose two pages belong to the same document and the page pair whose two pages belong to different documents. Then, in a case when both the two page images belong to the same document, the page pair does not have a boundary between documents, and, therefore, division is not performed between the preceding page and the following page of the page pair. On the other hand, in a case when two page images belong to different documents, the page pair has a boundary between documents, and, therefore, division is performed between the preceding page and the following page of the page pair.

At S303, the text extraction unit 210 converts the data of the two page images constituting the page pair obtained at S302 into text data of each page image. A specific procedure is as follows.

<<OCR Processing>>

First, by the OCR processing unit 211, OCR processing is performed for the data of two page images. At the time of OCR processing, first, character blocks are extracted by performing so-called block selection processing for each of the two page images. Then, character recognition processing is performed for each extracted character block and for each character within the character block, a specific character code is allocated.

<<Generation of Text Data>>

Next, by the text data generation unit 212, based on the results of the above-described OCR processing, text data of each of both pages constituting the page pair is generated. The text data is sentence data that integrates characters existing within the page into one and obtained by coupling characters recognized from the same page image. At the time of coupling characters, it may be possible to couple characters in order of being recognized in the OCR processing or couple in order in which a person reads each line from left to right. Further, in a case when there is a space between characters, it may also be possible to couple characters by inserting a space character or a symbol indicating a space therebetween. Further, it may also be possible to couple characters that are separated by line feed within the document by inserting a space character or a symbol indicating line feed at the time of coupling. Further, it may also be possible to perform processing, such as removal processing, for a character for which it is clear that the character has been recognized erroneously, resulting from blurring having occurred at the time of scanning.

Explanation is returned to the flowchart in FIG. 3.

Figure 4:
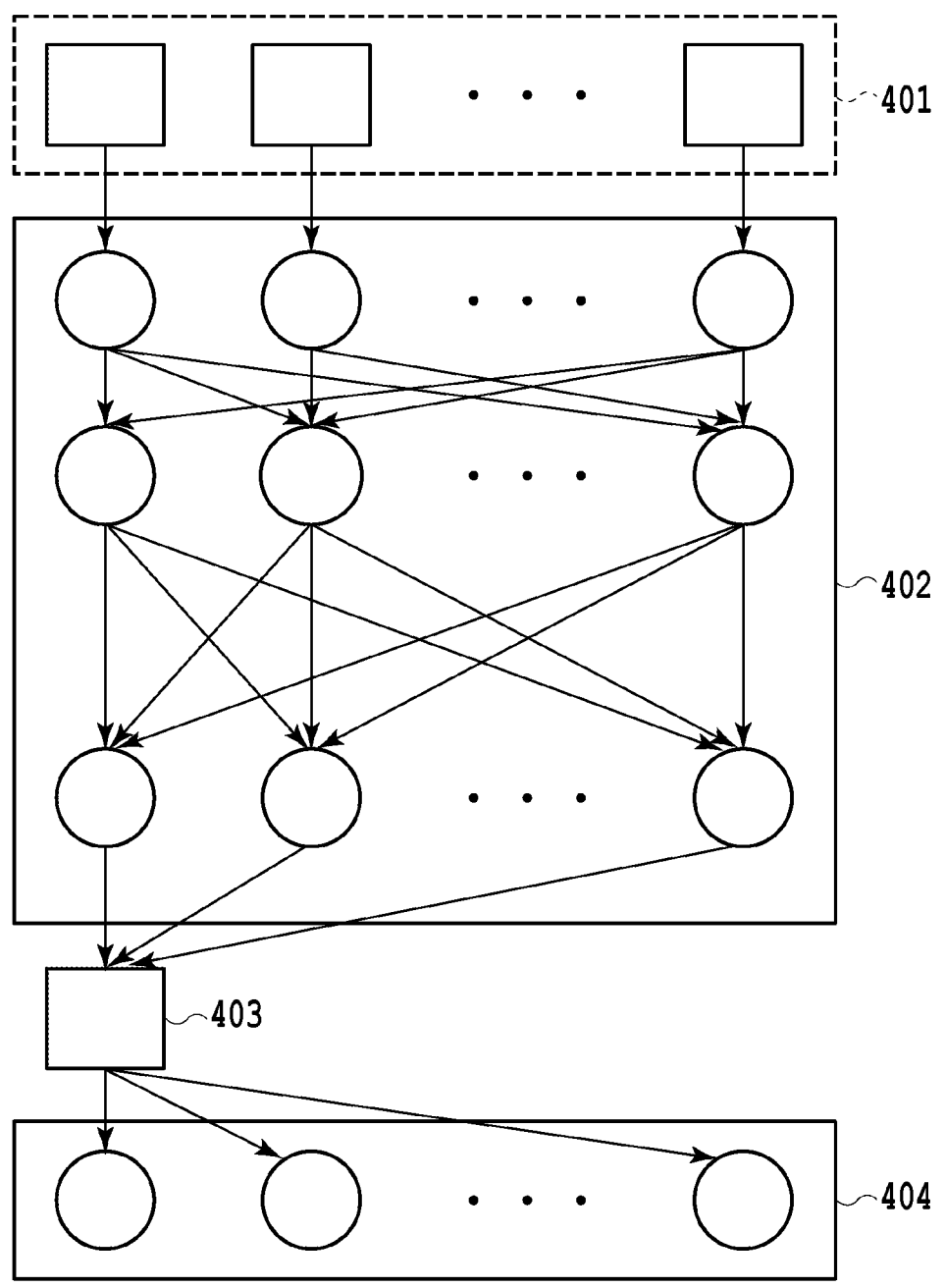
FIG. 4 is a diagram showing an outline of a neural network model.

S304 to S310 are processing relating to delimitation determination of whether it is appropriate to divide the scanned image data between both pages constituting the page pair (that is, between the preceding page and the following page) by the delimitation determination unit 220. For the delimitation determination, a neural network model obtained by learning is used. In more detail, for a general-purpose natural language processing model having been trained in advance by using a large amount of text data, a neural network model to which a unique determination layer (unique layer), such as a fully connected layer, is added is used. FIG. 4 is a diagram showing an outline of the neural network model according to the present embodiment. In FIG. 4, symbol 401 represents text data that is input and symbol 402 represents a natural language processing model having been trained in advance. The natural language processing model 402 according to the present embodiment has a structure in which neurons are connected in both directions. However, a natural language processing model in which neurons are connected in a single direction, represented by GPT, may be accepted. Symbol 403 indicates a vector that is output from the natural language processing model 402. Then, symbol 404 indicates a unique layer that connects to the vector that is output by the natural language processing model 402. Here, as the natural language processing model having been trained in advance, mention is made of, for example, BERT (Bidirectional Encoder Representations from Transformers), XLNet, and the like. It may also be possible to utilize a model having been trained in advance from scratch in place of utilizing the model disclosed to the general public as described above. Further, the model does not necessarily need to be a model having a transformer-based structure and what is required is to be a highly accurate natural language processing model having been trained in advance. For example, a model having a uniquely designed structure or a model having a structure designed automatically by AUTOML, or the like, may be accepted. In the following, explanation is advanced by taking a case as an example where BERT is utilized as a natural language processing model having been trained in advance.

Figure 5:
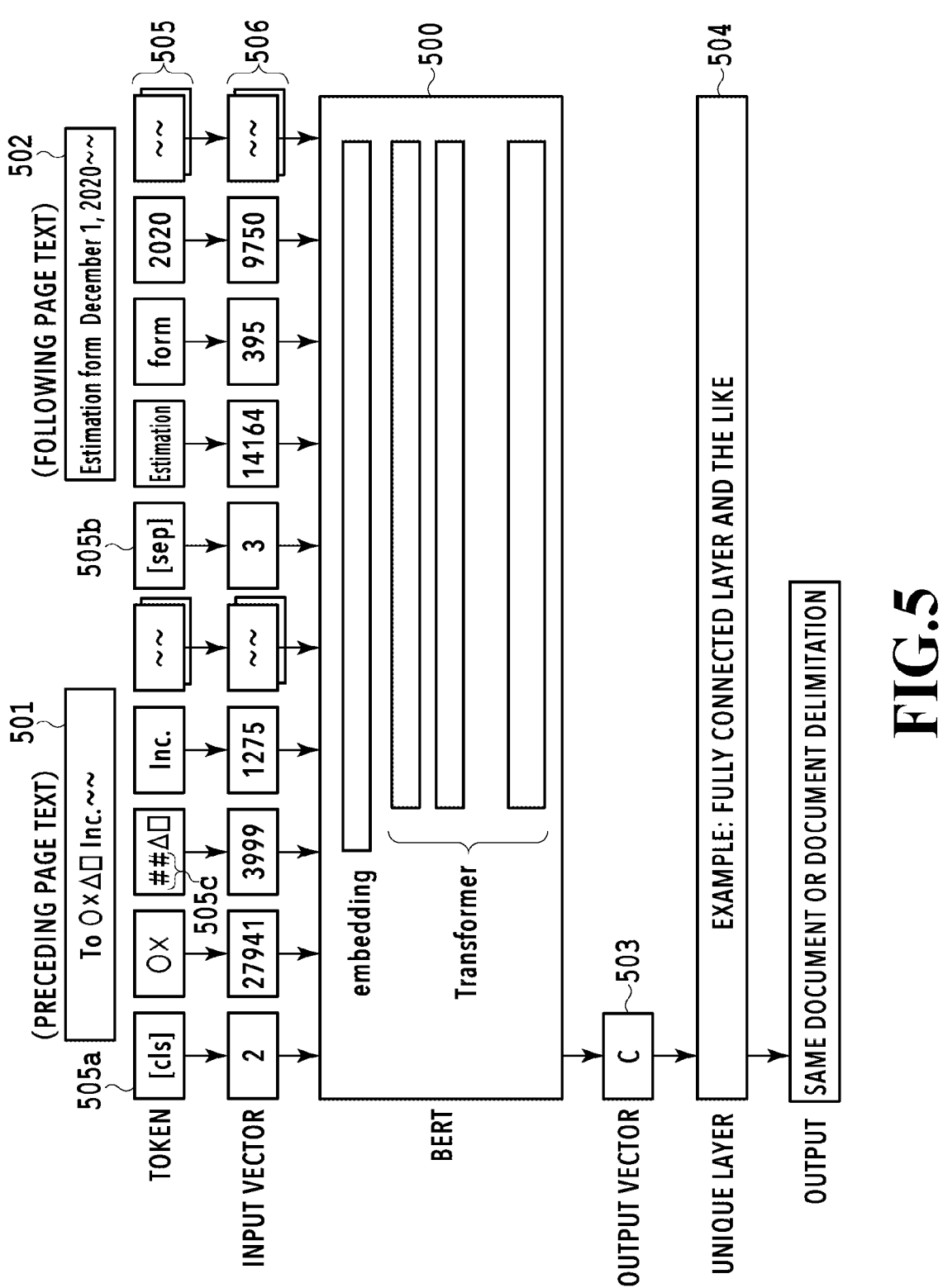
FIG. 5 is a conceptual diagram of delimitation determination utilizing bidirectional encoder representations from transformers (BERT)

FIG. 5 is a conceptual diagram of delimitation determination by utilizing BERT according to the present embodiment. In FIG. 5, BERT 500 has a characteristic of outputting a 768-dimensional vector 503 representing similarity, semantic relationship, and continuity between both pieces of text in a case of receiving text 501 and 502 of two page images relating to a page pair. In the present embodiment, by inputting the 768-dimensional vector 503 output from the BERT 500 to a unique layer 504, the solution of the binary classification problem, that is, results of determination of whether or not the target page pair corresponds to "document delimitation" are obtained. Because of this, after adding the unique layer 504 to the output layer of the BERT 500, as prior processing, fine tuning to adjust parameters is performed for a model for delimitation determination that takes two pieces of text data of a page pair as an input. The fine tuning is a learning method of taking parameters of a neural network, which are found by prior training, as initial values and then fine-adjusting them to parameters specialized in the problem to be solved. This fine tuning is known as a very effective method for improving accuracy of language processing. In the present embodiment, document delimitation determination is performed by inputting text data of each of two page images of a page pair to a model (trained model) obtained by performing the fine tuning aimed at delimitation determination for the BERT 500. Due to this, delimitation determination is enabled, which takes into consideration not only similarity in text between both page images but also semantic relationship and continuity between text. In the following, a specific procedure in the delimitation determination unit 220 is explained.

<<Decomposition of Text>>

First, at S304, the text decomposition unit 221 decomposes the text of each of two page images of a page pair into tokens. Here, in a case when text is Japanese, the text is decomposed into words (character strings) consisting of one or a plurality of characters as shown by symbol 505 in FIG. 5. Further, in a case when text is written in European language, for example, such as English, in which words are written by being divided by spaces, the text is decomposed into words, prefixes and suffixes thereof, or the like. At the time of decomposing text into tokens, it is desirable to use the same tokenizer as that used in the natural language processing model having been trained in advance (here, BERT).

Figure 6:
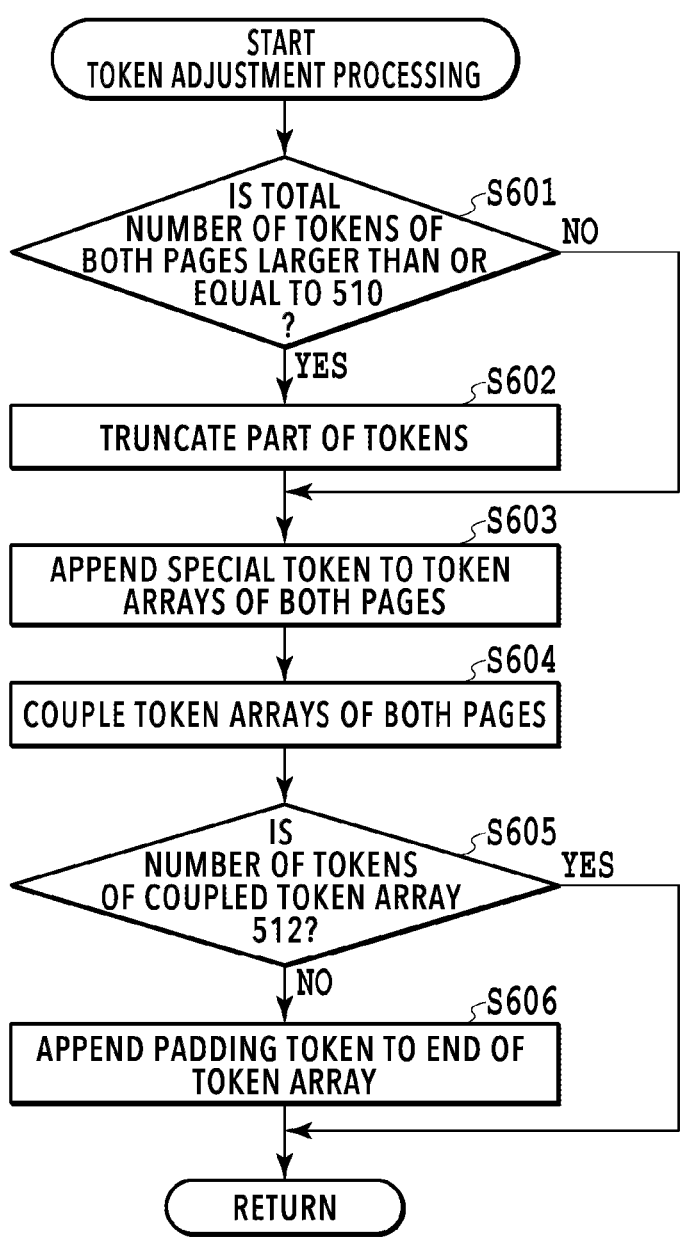
FIG. 6 is a flowchart showing details of token adjustment processing.

At next, S305, the token adjustment unit 222 performs token adjustment so that the tokens of both pages obtained at S304 meet the specifications of the neural network model that is used. FIG. 6 is a flowchart showing details of token adjustment processing according to the present embodiment. In a case of BERT, as the input vector, a vector obtained by converting a token into a numerical value, a vector representing the starting position of the token of the following page, and a vector representing the starting position of a padding token are necessary. Then, the upper limit of the number of tokens (number of words) that can be input is 512 and it is not necessarily possible to always input tokens corresponding to the entire text existing within a page. Further, it is necessary to input a single vector coupling the vector of the token corresponding to the text of the preceding page and the vector of the token corresponding to the text of the following page. In the token adjustment processing, the necessary processing as described above is performed. In the following, detailed explanation is given along the flowchart in FIG. 6.

<<Details of Token Adjustment Processing>>

First, at S601, whether or not the total number of tokens obtained by decomposing the text of the preceding page and tokens obtained by decomposing the text of the following page is larger than or equal to 510 is determined and based on the determination results, the processing is branched. Here, the reason threshold value processing is performed by taking 510 less than the upper limit 512 by 2 as a reference is for securing spaces for special tokens that are appended at S603, to be described later. In a case when the total number of tokens of both pages is larger than or equal to 510, the processing advances to S602 and in a case when the total number of tokens is less than 510, the processing advances to S603.

At S602, processing to truncate part of tokens obtained by decomposing the text corresponding to one page is performed. By this truncation processing, the total number of tokens is reduced to 509 or less. Here, a method is explained, which reduces the total number of tokens to 509 or less by extracting only the tokens included in a specified range of each of the preceding page and the following page and discarding the remaining tokens.

Here, it is assumed that each token extraction range on both pages is set to the range from the first token to the 256th token. In this case, it is no longer possible to input the tokens corresponding to the text existing on the lower side of each page. Consequently, the information on continuity in text between the preceding page and the following page is lost and the possibility of erroneous estimation becomes strong. On the other hand, in a case when it is assumed that the token extraction range is set to the range from the last token back to the 256th token from the bottom of the preceding page. In this case, it is no longer possible to input the tokens corresponding to the text existing on the upper side of the preceding page. Consequently, the information on the title, heading, and the like, is lost, and, therefore, the possibility of erroneous estimation becomes also strong. Because of this, by one of two kinds of extraction pattern shown in the following, only the tokens effective for the document delimitation determination are extracted from each of the preceding page and the following page of the page pair.

<<Extraction Pattern 1>>

Figure 7A:
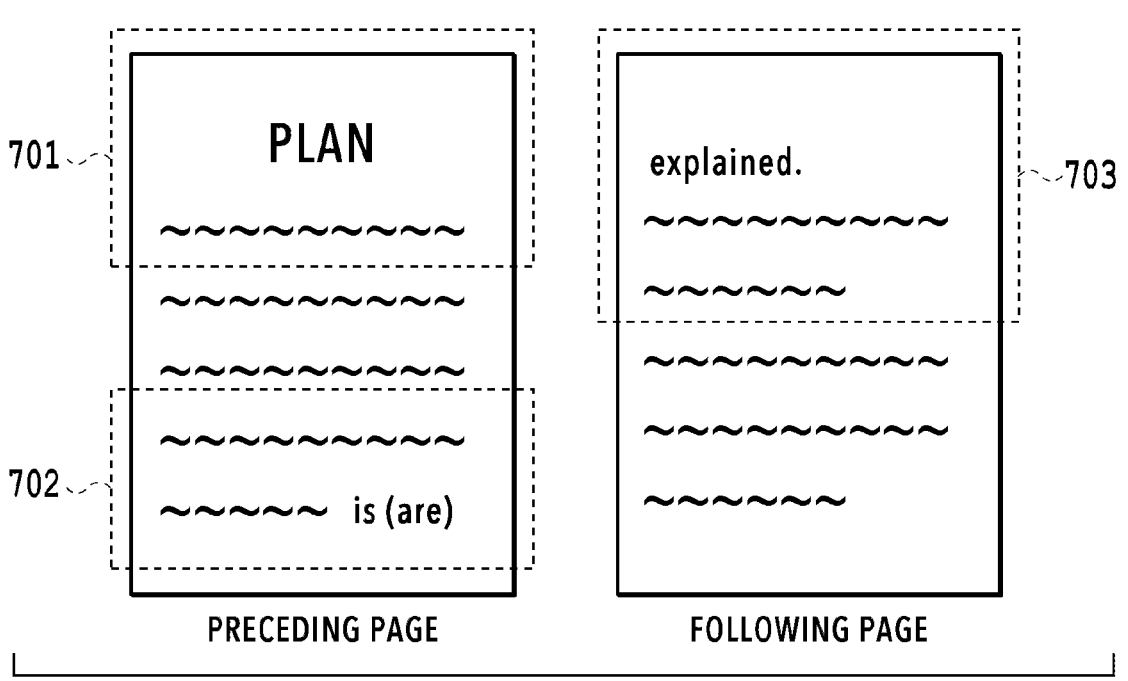
FIG. 7A and FIG. 7B are each a diagram explaining a token extraction range.

In the first extraction pattern, as shown in FIG. 7A, for the preceding page, an upper area 701 and a lower area 702 of the page image are taken as the token extraction range and for the following page, an upper area 703 of the page image is set as the token extraction range. This means that, for the preceding page, only the first token to the 127th token from the top of the page and the first token back the 127th token from the bottom of the page are extracted and the other tokens are truncated. Then, for the following page, this means that only the first token to the 255th token from the top of the page are extracted and the other tokens are truncated. In this case, the total number of tokens after the truncation is 508. By the truncation processing such as this, it is possible to include the material based on which the determination is performed in the input data, such as the similarity of header information, such as the title, heading, and the like, described in common on the upper side of a page, and the continuity of sentence text relating to whether the sentences are connected naturally across pages. As described above, by extracting only the tokens within the specified range on both pages and truncating the tokens outside the specified range, the total number of tokens is made fewer than or equal to 509. In the above-described example, the same number of tokens is extracted from each of the upper area and the lower area of the preceding page, but the number of tokens to be extracted may be different therebetween. Further, the same number of tokens is extracted from each of the preceding page and the following page, but the number of tokens to be extracted may be different between pages. That is, what is required is that the total number of tokens be less than or equal to 509 by extracting the tokens from the upper area and the lower area of the preceding page and from the upper area of the following page.

<<Extraction Pattern 2>>

Figure 7B:
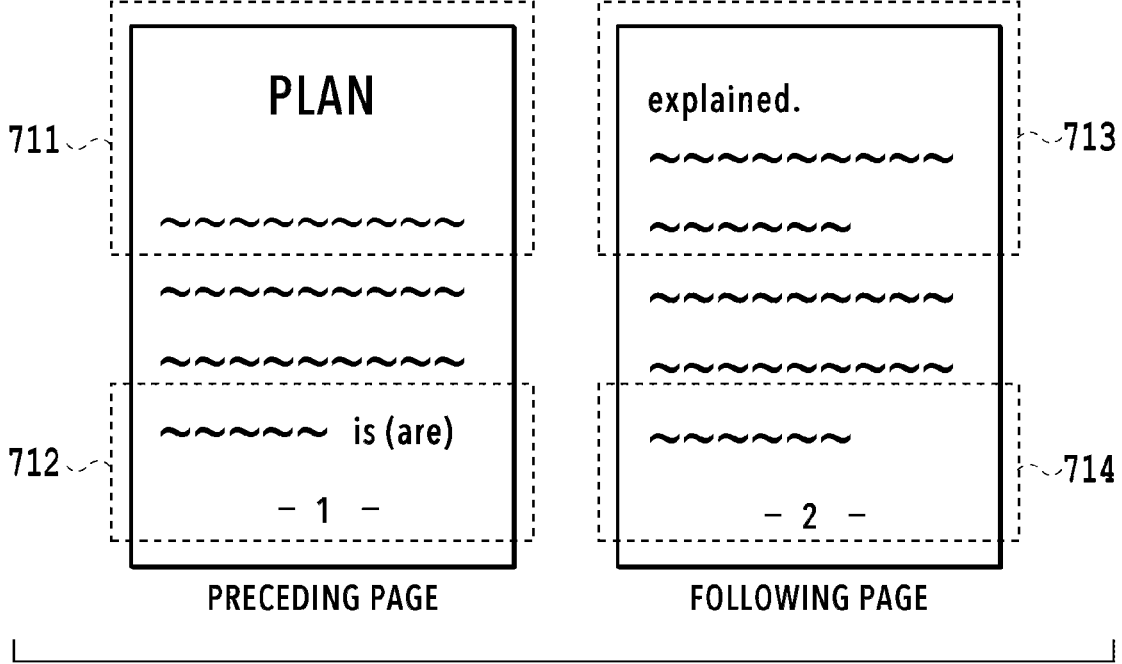

In the second extraction pattern, as shown in FIG. 7B, for the preceding page, an upper area 711 and a lower area 712 of the page are set as the token extraction range and for the following page also, an upper area 713 and a lower area 714 of the page are set as the token extraction range, This means that only the first token to the 127th token from the top of the page and the first token back to the 127th token from the bottom of the page are extracted and the other tokens are truncated for both the preceding page and the following page. In this case also, as in the extraction pattern 1, the total number of tokens after the truncation is 508. In this case, it is possible to further include the determination material on the continuity of the page number that is described in common at the bottom portion of the page and the similarity of text that is described as footer information, and, therefore, it is made possible to perform the delimitation determination more accurately.

As described above, by extracting only the tokens corresponding to the text within the specified range that is set in advance and truncating the other tokens, the total number of tokens is made fewer than or equal to the number of tokens that can be input to the neural network model.

At next S603, to the array of the tokens (in the following, called "token array") extracted from the preceding page and the following page, respectively, a predetermined special token is appended. In the specific example shown in FIG. 5 described previously, a "[cls]" token 505a arranged at the top of the token array of the preceding page and a "[sep]" token 505b arranged at the top of the token array of the following page correspond to the special token. Here, "##" within a "##Δ□" token 505c of the previous page is a sub-token indicating that the token is connected with the immediately preceding token (here, "◦x" token).

At next, S604, the token array of the preceding page and the token array of the following page, to which the special token is appended respectively, are coupled. Due to this, one token array obtained by coupling the tokens corresponding to the text of both pages (in the following, called "coupled token array") is generated.

At S605 that follows, in order to cause the length of the input vector to the neural network model to have a fixed length (here, 512 tokens), whether the total number of tokens constituting the coupled token array is 512 is determined. In a case when the results of the determination indicate that the number of tokens is fewer than 512, the processing advances to S606 and in a case when the total number of tokens is 512, this processing is exited.

At S606, a padding token for compensating for the token that the fixed length lacks is appended to the end of the coupled token array.

The above is the contents of the token adjustment processing. In this manner, the token array appropriate to the neural network model and corresponding to the text of the page pair is obtained.

Explanation is returned to the flowchart in FIG. 3.

At S306, the token array obtained by the token adjustment processing is converted into a numerical vector by a token conversion dictionary specified by BERT. In the specific example shown in FIG. 5 described previously, a numerical value 506, such as "2", "27941", and "3999", which is associated with each token, indicates a converted numerical vector. Further, a vector (not shown schematically) representing the starting position of the token of the following page and a vector (not shown schematically) representing the starting position of the padding token are appended to predetermined positions. By these vectors appended to the predetermined positions, it is possible for BERT to reduce the processing time and perform weight updating of the attention mechanism inside BERT efficiently. In this manner, the input vector in the format suitable to the neural network model is obtained.

At next, S307, the delimitation position determination unit 224 inputs the input vector generated at S306 to the neural network model and derives a delimitation determination score. The delimitation determination score is obtained by turning the level of the possibility that two page images relating to a page pair belong to different documents respectively into a numerical value. At the time of deriving the delimitation determination score, it may be possible to utilize the output value of the neural network model as it is or utilize a value obtained by applying the activation function, such as the softmax function and the sigmoid function, to the output value.

At S308, whether or not the delimitation determination score derived at S307 is higher than or equal to a predetermined threshold value is determined. This threshold value is for determining whether two page images constituting a processing-target page pair belong to the same document or belong to different documents, respectively. Consequently, the threshold value here may be, for example, the intermediate value of the value that may be derived as the delimitation determination score, or it may also be possible to utilize a value whose determination accuracy is high at the time of fine tuning. In a case when the determination results indicate that the derived score is higher than or equal to the threshold value, the processing advances to S309 and, in a case when the derived score is less than the threshold value, the processing advances to S310. At S309, the delimitation position determination unit 224 determines that the portion between the two page images constituting the processing-target page pair corresponds to the document delimitation position and stores the page number of the preceding page, which is the page of interest, in the RAM 103 as the page number of the delimitation page.

At next, S310, whether or not the above-described processing has been performed, by taking all the page pairs in the input scanned image data as the target, is determined. In a case when the determination results indicate that there remains an unprocessed page pair, the processing returns to S302 and the page pair that takes the following page as of the current point of time as the next page of interest (preceding page) is obtained and the processing is continued. On the other hand, in a case when the processing for all the page pairs is completed, the processing advances to S311.

Then, at S311, the image division unit 230 divides the input scanned image data into each document based on the page number information stored at S309. For example, it is assumed that the scanned image data includes page images corresponding to ten pages and "3" and "7" are stored as the page number of the delimitation page by the delimitation determination unit 220. In this case, the scanned image data is divided into three pieces of image data, that is, image data of the first to third pages, image data of the fourth to seventh pages, and image data of the eighth to tenth pages. The image data of each document thus divided is output to the host PC 115 and the like via the network I/F 108.

Modification Example 1

In the token adjustment processing (S602) in the flow in FIG. 6 described above, as the method of truncating part of tokens, the method of extracting only the tokens included in the specified range of each page is explained. Instead of this method, it may also be possible to reduce the number of tokens by applying, for example, a method in 1) or 2) below.

(1) The number of tokens is reduced by shortening text by a summarization technique and (2) Only the tokens corresponding to the specific part of speech are extracted by performing the morphological analysis for text In the following, each method is explained briefly.

The token adjustment unit 222 in a case of performing token reduction processing by the method described above in (1) has a text summarization function. Then, in a case when the total number of tokens of both pages is larger than or equal to 510, the text of both pages, which is generated by the text data generation unit 212, is summarized. Specifically, for each of the preceding page and the following page, short text including only essential points is created from the text of the entire page. For example, in a case where the target to be scanned is a report, text data including one thousand or more characters, in which details of the background, theme, and results are written, is converted into text data including about two hundred characters, with which it is possible to grasp the outline of the page, by summarizing each of the background, theme, and results into one sentence. Then, the summarized text data is returned to the text decomposition unit 221 and the summarized text is decomposed into tokens again. By taking the tokens corresponding to the summarized text thus obtained as a target, the processing at S603 and subsequent steps is performed and conversion is performed into a vector that can be input to the neural network model. It may also be possible to perform the determination processing at S601 again for the summarized text and then cause the processing to advance to S603 after confirming that the total number of tokens of both pages is less than 510. In a case when the total number of tokens is larger than or equal to 510, it may also be possible to further summarize the summarized text or apply the above-described method of extracting tokens from the specified range within the page to the summarized text.

The token adjustment unit 222 that performs token reduction processing by the method described above in (2) has a morphological analysis function. Then, in a case when the total number of tokens of both pages is greater than or equal to five hundred ten, the morphological analysis is performed for the tokens of both pages. The morphological analysis technique is a technique to divide a sentence written in a natural language into the smallest unit (morpheme) having a linguistic meaning and determine each part of speech, change, and the like, and implemented by the morphological analysis engine represented by MeCab, and the like, in a case of Japanese. Due to this, for example, processing to extract only verbs and nouns within text and remove words, such as conjunctions, is enabled. Only the tokens corresponding to nouns and verbs thus obtained are extracted and the processing at S603 and subsequent steps is performed and then they are converted into a vector that can be input to the neural network model. What is required is to reduce the total number of tokens to less than five hundred ten and it is possible to change which part of speech to be left in accordance with the number of tokens of each page.

As a modification example other than those described above, for example, it may also be possible to extract only the tokens corresponding to specific character strings, such as the title and the creator name, from the text. Further, it may also be possible to perform the truncation processing by all the methods described above at the time of fine tuning and apply the method whose accuracy is the highest among them at the time of estimation. Alternatively, it may also be possible to perform the image analysis for each page image of the scanned image data and automatically determine the truncation method. For example, in a case when the title and header information are detected by the image analysis, the first token and the subsequent predetermined number of tokens are taken as the token extraction range and in a case when the page number and footer information are detected, the last token and the preceding predetermined number of tokens are taken as the token extraction range, and so on.

Modification Example 2

In the flowchart in FIG. 3 described above, the portion between the two page images constituting the page pair whose delimitation determination score is higher than or equal to the threshold value is determined to be the delimitation position. In this case, unless a score higher than or equal to the threshold value is derived, the scanned image data is not divided into the image data of each document. In a case when the scanned image data corresponds to one document, there is no problem, but in a case when a score higher than or equal to the threshold value is not derived for some reason for scanned image data of a plurality of documents, there arises a problem. Consequently, for example, in a case when the number of scanned documents is known in advance, or the like, the delimitation determination scores for all the page pairs are stored temporarily. Then, it may also be possible to determine the delimitation position in order from the number of page pairs whose score is high, which is the number of scanned documents minus 1 (one), and perform division. For example, in a case when it is known in advance that ten documents are scanned, it is made possible to perform division at the position between pages of the nine page pairs whose scores are the highest to the ninth highest.

Modification Example 3

In the above-described embodiment, an explanation is given on the assumption that the MFP 100 in FIG. 1 comprises the image processing unit 106, but the present disclosure is not limited to the configuration such as this. It may also be possible to implement the image processing unit 106 in FIG. 2 on the server apparatus or the image processing system, such as a virtual server on the cloud computing. In that case, for example, the MFP 100 transmits the document image scanned by the scanner unit to the server via the network. Then, the server performs OCR processing, delimitation determination processing, and image division processing for the received document image by using the image processing unit 106 within the server. After that, the server transmits the division processing results to the host PC via the network (or via the MFP 100).

It may also be possible to implement, in place of implementing each of all the processing units 210 to 230 of the image processing unit 106 in FIG. 2 on the server or cloud, part of the configuration thereof on the server or cloud. For example, a configuration may be accepted in which the MFP 100 comprises the text extraction unit 210 and the image division unit 230 and the server or cloud comprises the delimitation determination unit 220. In that case, the MFP 100 generates text data by performing OCR processing for each page of the scanned document image and stores image data, as well as transmitting the text data to the delimitation determination unit of the server or the cloud. Then, the delimitation determination unit of the server or the cloud having received text data returns the information on the determined delimitation position to the MFP by performing each piece of processing of the text decomposition unit 221 to the delimitation position determination unit 224. Then, the MFP divides the stored image data based on the received information on the delimitation position and outputs the division results.

As described above, according to the present embodiment and the modification examples thereof, it is possible to accurately divide the scanned image data obtained by scanning a plurality of documents en bloc into image data of each document.

OTHER EMBODIMENTS

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

According to the technique of the present disclosure, it is possible to accurately divide the scanned image data obtained by scanning a plurality of documents en bloc into image data of each document.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image processing apparatus that divides scanned image data including a plurality of page images obtained by scanning a plurality of documents en bloc for each page into image data of each document, the apparatus comprising:
   one or more memories storing instructions; and
   one or more processors executing the instructions:
      to generate text data by performing character recognition processing for the plurality of page images;
      to sequentially obtain a pair of page images in succession from the plurality of page images and then to determine a document delimitation position based on text data of the two page images constituting the pair; and
      to divide the scanned image data at the determined delimitation position, wherein, in the determining:
      a vector corresponding to tokens obtained by decomposing the text of each of the two page images constituting the pair is generated and input the vector to a neural network model;
      the delimitation position is determined by using a score output from the neural network model and representing the level of a possibility by a numerical value that the two page images constituting the pair belong to different documents, respectively; and,
      in a case when the number of documents of the plurality of documents is known in advance, a portion between the two page images constituting the pair is determined to be the delimitation position for a number of pairs in order from the pair whose output score is the highest, the number being the number of documents of the plurality of documents minus one.

2. The image processing apparatus according to claim 1, wherein, in the determining, a portion between the two page images constituting the pair whose score is higher than or equal to a threshold value is determined to be the delimitation position.

3. The image processing apparatus according to claim 1, wherein, in the determining, tokens obtained by performing adjustment processing to match tokens obtained by decomposing the text with specifications of the neural network model are converted into the vector.

4. The image processing apparatus according to claim 3, wherein the adjustment processing includes reduction processing to reduce the number of tokens so that the tokens can be input to the neural network model.

5. The image processing apparatus according to claim 4, wherein the reduction processing is processing to truncate part of tokens obtained by decomposing text corresponding to one page in a case where there is an upper limit to the number of tokens that can be input to the neural network model and the total number of tokens obtained by decomposing the text corresponding to one page exceeds the upper limit.

6. The image processing apparatus according to claim 5, wherein the processing to truncate part of tokens is processing to extract only tokens corresponding to text in an upper area and a lower area of the page image for the preceding page of the two page images constituting the pair, and for the following page, extract only tokens corresponding to text in an upper area of the page image.

7. The image processing apparatus according to claim 5, wherein the processing to truncate part of tokens is processing to extract only tokens corresponding to text in an upper area and a lower area of each of the two page images constituting the pair.

8. The image processing apparatus according to claim 4, wherein the reduction processing is processing to shorten the decomposition-target text by summarizing text of each of the two page images constituting the pair.

9. The image processing apparatus according to claim 4, wherein the reduction processing is processing to extract only tokens corresponding to a specific part of speech by performing morphological analysis for text of each of the two page images constituting the pair.

10. The image processing apparatus according to claim 1, wherein, in the neural network model, to a natural language processing model having been trained in advance, a unique determination layer is added and for which, fine tuning aiming at determining the delimitation position has been performed.

11. The image processing apparatus according to claim 10, wherein the natural language processing model having been trained in advance is BERT (Bidirectional Encoder Representations from Transformers).

12. The image processing apparatus according to claim 1, wherein the one or more processors further execute the instructions to obtain the plurality of page images by scanning the plurality of document images.

13. The image processing apparatus according to claim 1, wherein the image processing apparatus is a server apparatus.

14. The image processing apparatus according to claim 1, wherein the image processing apparatus is a virtual server by cloud computing.

15. An image processing method of dividing scanned image data including a plurality of page images obtained by scanning a plurality of documents en bloc for each page into image data of each document, the method comprising the steps of:
   generating text data by performing character recognition processing for the plurality of page images;
   sequentially obtaining a pair of page images in succession from the plurality of page images and then determining a document delimitation position based on text data of the two page images constituting the pair; and
   dividing the scanned image data at the determined delimitation position,
   wherein, in the determining step:
      a vector corresponding to tokens obtained by decomposing the text of each of the two page images constituting the pair is generated and input the vector to a neural network model;

the delimitation position is determined by using a score output from the neural network model and representing the level of a possibility by a numerical value that the two page images constituting the pair belong to different documents, respectively; and, in a case when the number of documents of the plurality of documents is known in advance, a portion between the two page images constituting the pair is determined to be the delimitation position for a number of pairs in order from the pair whose output score is the highest, the number being the number of documents of the plurality of documents minus one.

16. A non-transitory computer readable storage medium storing a program for causing a computer to perform an image processing method of dividing scanned image data including a plurality of page images obtained by scanning a plurality of documents en bloc for each page into image data of each document, the method comprising the steps of:

generating text data by performing character recognition processing for the plurality of page images;

sequentially obtaining a pair of page images in succession from the plurality of page images and then determining a document delimitation position based on text data of the two page images constituting the pair; and dividing the scanned image data at the determined delimitation position, wherein, in the determining step:

a vector corresponding to tokens obtained by decomposing the text of each of the two page images constituting the pair is generated and input the vector to a neural network model;

the delimitation position is determined by using a score output from the neural network model and representing the level of a possibility by a numerical value that the two page images constituting the pair belong to different documents, respectively; and, in a case when the number of documents of the plurality of documents is known in advance, a portion between the two page images constituting the pair is determined to be the delimitation position for a number of pairs in order from the pair whose output score is the highest, the number being the number of documents of the plurality of documents minus one.

* * * * *